United States Patent
Zlobinskij et al.

(10) Patent No.: US 12,123,997 B2
(45) Date of Patent: Oct. 22, 2024

(54) METHOD OF PROSPECTING FOR THREE-DIMENSIONAL BODIES USING GEOELECTRIC TM-POLARIZATION TECHNIQUES

(71) Applicant: OBSCHESTVO S OGRANICHENNOJ OTVETSTVENNOSTJU "NAUCHNO-TEHNICHESKAJA KOMPANIJA ZAVETGEO", Novosibirsk (RU)

(72) Inventors: Arkadij Vladimirovich Zlobinskij, Novosibirsk (RU); Vladimir Sergeevich Mogilatov, Novosibirsk (RU)

(73) Assignee: OBSCHESTVO S OGRANICHENNOJ OTVETSTVENNOSTJU "NAUCHNO-TEHNICHESAKAJA KOMPANIJA ZAVET-GEO", Novosibirsk (RU)

( * ) Notice: Subject to any disclaimer, the term of this patent is extended or adjusted under 35 U.S.C. 154(b) by 300 days.

(21) Appl. No.: 17/432,030

(22) PCT Filed: Dec. 30, 2019

(86) PCT No.: PCT/RU2019/001047
§ 371 (c)(1),
(2) Date: Aug. 18, 2021

(87) PCT Pub. No.: WO2020/176010
PCT Pub. Date: Sep. 3, 2020

(65) Prior Publication Data
US 2022/0137249 A1    May 5, 2022

(30) Foreign Application Priority Data
Feb. 26, 2019   (RU) .......................... RU2019105376

(51) Int. Cl.
*G01V 3/08*     (2006.01)

(52) U.S. Cl.
CPC .............. *G01V 3/081* (2013.01); *G01V 3/088* (2013.01)

(58) Field of Classification Search
USPC .................................................. 324/323–375
See application file for complete search history.

(56) References Cited

U.S. PATENT DOCUMENTS 6,114,855 A * 9/2000 Petrovich ................. G01V 3/02
                                                   324/357
6,320,386 B1 * 11/2001 Balashov ................. G01V 3/02
                                                   324/357
(Continued)

FOREIGN PATENT DOCUMENTS

AU      2006309416 A1 * 5/2008 ............. G01V 3/083
EA          022910 B1 * 3/2016
(Continued)

OTHER PUBLICATIONS

Zlobinsky A. V., Mogilatov V. S.: "Elektrorazvedka metodom Zvt V Rudnoi Geofizikz" (Electrical prospecting using the VECS method in the native geophysics), 2014. pp. 27-35 (Year: 2014).*

(Continued)

*Primary Examiner* — Alexander Satanovsky
*Assistant Examiner* — Trung Q Nguyen
(74) *Attorney, Agent, or Firm* — Muncy, Geissler, Olds & Lowe, P.C.

(57) ABSTRACT

The invention relates to geoelectric prospecting using transient electromagnetic techniques and can be used for detecting three-dimensional bodies in a medium. The problem addressed is that of increasing the resolution capability of electric exploration and the depth of investigation. The (Continued)

Figure 1:
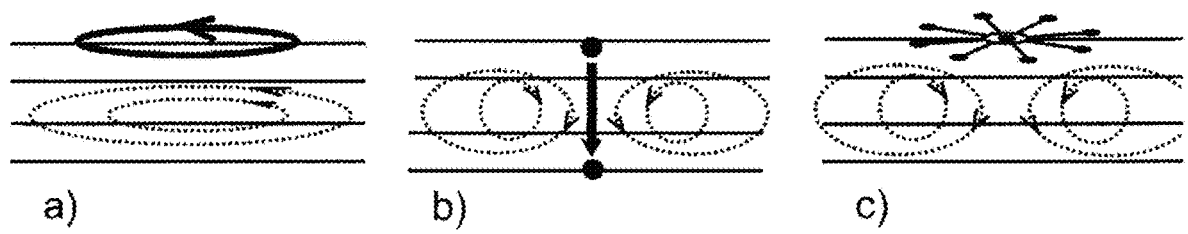

essence of the invention is that in a method of prospecting for three-dimensional bodies using geoelectric techniques which includes generating an alternating transverse magnetic (TM) polarized electromagnetic field, measuring an electromagnetic transient response signal of the medium under investigation and interpreting the measurements, the magnetic and electric components of the electromagnetic field are measured and interpreted according to signals received using a three-dimensional model, for which purpose the centre of three-dimensional heterogeneity above which a change in the polarity of the signal takes place is determined on the basis of the measured values of the vertical component of the magnetic field, and the boundary of multiple reservoirs in the target bodies that is near to the source is determined according to a signal of the horizontal angular magnetic component which changes polarity as it approaches the boundaries of a feature, the signals of the horizontal angular magnetic component of the electromagnetic field having the highest value above the feature, between the near-source boundary and the centre of the source, wherein the near-source boundary of the deposits of the target bodies is additionally determined according to an electric component of the electromagnetic field, the character of the signal of which changes drastically upon crossing the boundary of the feature. The transverse magnetic polarized electromagnetic field is generated using both a circular electric dipole and a vertical line.

2 Claims, 6 Drawing Sheets

(56) References Cited

U.S. PATENT DOCUMENTS

| | | | |
|---|---|---|---|
| 2009/0121719 A1* | 5/2009 | Rykhlinski | G01V 3/12 |
| | | | 702/6 |
| 2010/0085055 A1* | 4/2010 | Barsukov | G01V 3/083 |
| | | | 324/337 |
| 2022/0137249 A1* | 5/2022 | Zlobinskij | G01V 3/02 |
| | | | 324/200 |

FOREIGN PATENT DOCUMENTS

| | | | | | |
|---|---|---|---|---|---|
| EP | 1887386 | A1 | * | 2/2008 | ............ G01V 3/06 |
| JP | 2011508205 | A | * | 3/2011 | |
| RU | 2248016 | C1 | * | 3/2005 | |
| RU | 2453872 | C1 | | 6/2012 | |
| RU | 2454683 | C1 | | 6/2012 | |
| RU | 2528115 | C1 | * | 9/2014 | |
| RU | 2557675 | C2 | * | 7/2015 | |
| RU | 2676396 | C1 | * | 12/2018 | ............ G01V 3/08 |
| SU | 150184 | A1 | | 11/1961 | |
| WO | WO-01/20366 | A1 | | 3/2001 | |
| WO | WO-2009064213 | A1 | * | 5/2009 | ............ G01V 3/12 |
| WO | WO-2019132699 | A1 | * | 7/2019 | ............ G01V 3/08 |
| WO | WO-2020176010 | A1 | * | 9/2020 | ............ G01V 3/04 |
| WO | WO-2020176011 | A1 | * | 9/2020 | |
| WO | WO-2022193403 | A1 | * | 9/2022 | ............ G01V 3/08 |

OTHER PUBLICATIONS

Mogilatov et al., A circular electric dipole: atransmitter for TEM surveys. Russian Geology and Geophysics 55 (2014) (Year: 2014).*
Zlobinsky A. V., Mogilatov V. S.: "Elektrorazvedka metodom Zvt V Rudnoi Geofizikz" (Electrical prospecting using the VECS method in the native geophysics), No. 1, 2014, pp. 27-35.

* cited by examiner a)

b)

METHOD OF PROSPECTING FOR THREE-DIMENSIONAL BODIES USING GEOELECTRIC TM-POLARIZATION TECHNIQUES

FIELD OF THE INVENTION

The invention relates to geoelectric prospecting using techniques of generating an electromagnetic field and can be used to detect the boundaries of three-dimensional bodies in a medium. Detecting three-dimensional bodies in the medium located at great depths or being low-contrast in resistivity is still an unsolvable problem or difficult challenge.

BACKGROUND OF THE INVENTION

A method of electric exploration is known (patent RU 2454683), in which method an electric field is excited in the earth by axisymmetric introduction of an electric current into the earth, and the parameters of the electric field are measured along profiles radially diverging from the point of introduction of the axisymmetric electric current into the earth. In this case, the axisymmetric introduction of the current into the earth is ensured by the uniform arrangement of outer current electrodes (groundings) around the circumference and by connecting them through radial lines to one pole of the current source. The size of the radius of the circle is determined by the required depth of investigation. In this case, the inner current electrode is grounded at the centre of the circle formed by the outer current electrodes and is connected to the other pole of the current source. Since the publication of the method, such a source has been called a circular electric dipole (CED).

The electromagnetic response of the field under study is measured over the area around the source at a distance of up to 7 CED radii. At the same time, depending on the required depth and size of the source, the investigated area can be up to 400 sq. km. On the basis of the known method, the Vertical electric current soundings (VECS) has been developed and applied.

There is a known method for exciting an electromagnetic field in a medium, described in SU 150184, in which method the electromagnetic field is excited in the earth or in the sea using a vertical electric line.

Also known is a method for exciting an electromagnetic field (patent RU 2453872), in which method the electromagnetic field is excited in a medium using a counter electric line. Counter electric line represents horizontal electric lines located on the same line and connected towards each other.

Closest to the proposed invention is the device described in the patent RU 2454683. The patent describes a method for exciting a TM-polarized field in a medium. The patent does not describe which components of the electromagnetic field are to be measured and how to interpret the received signals. In geoelectrics conducted from the day surface, the models of the medium take into account only the change in isotropic resistivity and, as a rule, in one-dimensional version. The standard approach is to measure one component of the electromagnetic field and interpret the received signals within one-dimensional model based on isotropic resistivity.

The standard approach to the interpretation of materials allows obtaining information about the host medium, about large horizontally lying formations. This traditional approach does not allow obtaining information about relatively small three-dimensional bodies in the medium. To meet the challenges modern geophysicists face, it is necessary to identify three-dimensional bodies located at much deeper depths. To detect such bodies, more information should be collected and interpreted within the framework of three-dimensional approach.

The technique described in this invention makes it possible to increase the resolution capability of electric exploration and the depth of investigation. The claimed invention describes a method for measuring signals that cannot be interpreted within the framework of horizontally layered medium. The patent describes a method for three-dimensional signal interpretation that increases the sensitivity to three-dimensional inclusions, compared to classical electric exploration techniques based on the one-dimensional interpretation. Based on the measured vertical component of the magnetic field, we determine the centre of the three-dimensional heterogeneity, wherein the polarity of the signal changes over the centre of the heterogeneity. Based on the measured angular component of the magnetic field, we determine the point between the boundary of the feature that is near to the source of the field and the centre of the feature. According to calculations, the signals of the horizontal angular magnetic component of the electromagnetic field have the greatest value above the feature, between the near boundary of the target body and the centre of the target body, and the signal changes polarity as it approaches the boundaries of the body.

Hereinafter, a cylindrical coordinate system is used. In the cylindrical coordinate system, a point is defined by the radial coordinate denoted by the letter r, the angular coordinate denoted by the letter φ, and the coordinate z. In the cylindrical coordinate system, if the centre of the source is taken as the centre of coordinates, then the angular and radial components represent horizontal fields. The angular component is directed along the circles (the centre of the coordinate system is the centre of the source). The radial component is directed along the radii (the centre of the coordinate system is the centre of the source).

SUMMARY OF THE INVENTION

The essence of the invention is that in a method of prospecting for three-dimensional bodies using geoelectric techniques which includes generating an alternating transverse magnetic (TM) polarized electromagnetic field, measuring an electromagnetic transient response signal of the medium under investigation and interpreting the measurements, wherein it is proposed to measure the magnetic and electric components of the electromagnetic field and interpret them according to signals received using a three-dimensional model, for which purpose the centre of three-dimensional heterogeneity above which a change in the polarity of the signal takes place is determined on the basis of the measured values of the vertical component of the magnetic field, and the boundary of multiple deposits of the target bodies that is near to the source is determined according to a signal of the horizontal angular magnetic component which changes polarity as it approaches the boundaries of a feature, the signals of the horizontal angular magnetic component of the electromagnetic field having the highest value above the feature, between the near-source boundary and the centre of the source. Wherein the boundary of the deposits of the target bodies that is near to the source of the alternating transverse magnetic (TM) polarized electromagnetic field is additionally determined according to an electric component of the electromagnetic field, the character of the signal of which changes drastically upon crossing the boundary of the feature.

The alternating transverse magnetic (TM) polarized electromagnetic field can be generated using both a circular electric dipole (CED) and a vertical line.

Both sources, the circular electric dipole and the vertical electric line, have in common the excitation of a field of only TM polarization in the medium. Over the entire area around the circular electric dipole and the vertical electric line, an electromagnetic field of only TM-polarization is excited. Both sources differ from other sources widely used in electric exploration with artificial sources by the excitation of the electromagnetic field of only TM-polarization in the medium (FIG. 1).

It is known that any electromagnetic field excited in the earth by artificial or natural sources can be represented by a superposition of TM-polarized and TE-polarized fields. If a purely TM-polarized electromagnetic field is excited in the medium under investigation by introduction of an electric current of a pulsed or harmonic form into the earth, then all three magnetic components of the electromagnetic field will be zero over horizontally layered medium. On the other hand, if the field above the medium, in which the electromagnetic field is excited by TM-polarization only, is not zero, then this is evidence of the presence of three-dimensional heterogeneities in the medium in terms of some electrodynamic parameter (FIG. 1).

Figure 2:
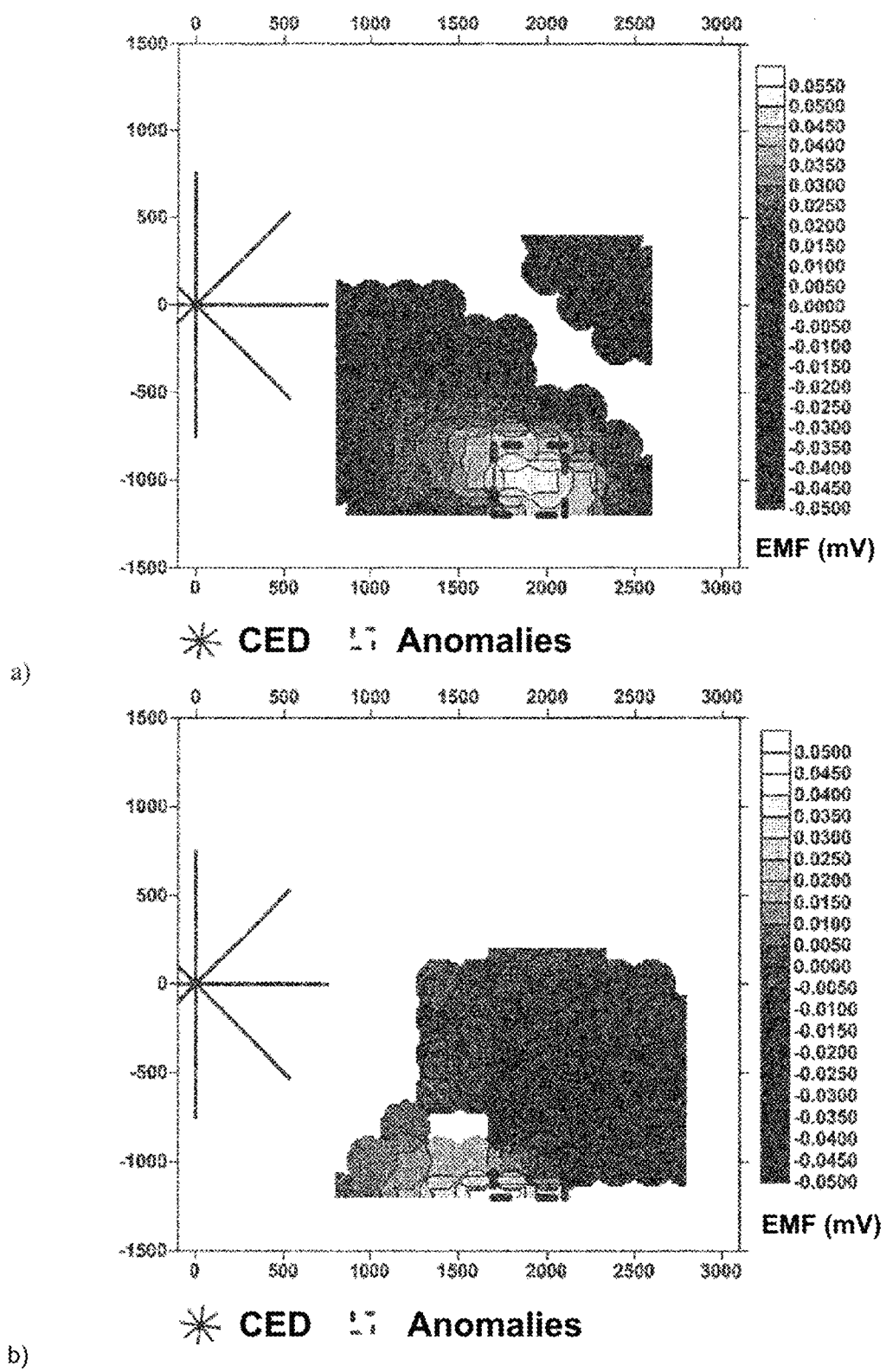

If the magnetic field is measured, then there are three-dimensional heterogeneities in one of the electrodynamic parameters. Let us set the model of a body that stands out in terms of resistivity and calculate the signals of the magnetic components. According to calculations, above the centre of such a feature, the signals of the magnetic component of the electromagnetic field $dB_z/dt$ change polarity, i.e. the signal has the smallest value above the centre of the target body. According to calculations, above the feature, between the near boundary of the target body and the centre of the target body, the signals of the magnetic component of the electromagnetic field $\partial B_\varphi/\partial t$ have the greatest value, and the signal changes polarity as it approaches the boundaries of the feature (FIG. 2).

It has been experimentally shown that when carrying out investigation using a source that excites the electromagnetic field of only TM polarization, when searching for deposits of polymetallic ores and kimberlites, the shape of the measured electric signals $E_r$ changes drastically upon crossing the near-source boundary of the feature, transitions through zero occur in the signal.

This invention describes a method for detecting three-dimensional bodies during electric exploration. Electric exploration is carried out by excitation of TM-polarized electromagnetic field in a medium. The measured magnetic components on the surface of the medium determine the initial approximation that allows to localize the feature in the medium, and then the exact location of the feature is determined by solving the inverse three-dimensional problem. Additional information is provided by the signals of the electric components, which are used to determine the boundary of the feature that is near to the source at the deposits of polymetals and kimberlites. The invention describes how to determine the presence of three-dimensional bodies in a medium by measuring the magnetic and electric components of the electromagnetic field when a TM-polarized electromagnetic field is excited in the medium.

The details, features, and advantages of the present invention are explained using the drawings, which show:

FIG. 1—Current lines excited in a medium by a classical source of TE-polarized electromagnetic field in FIG. 1a. Current lines excited in a medium by a source of TM-polarized electromagnetic field, which is a vertical electric line, are shown in FIG. 1b. Current lines excited in a medium by a source of TM-polarized electromagnetic field, which is a circular electric dipole, are shown in FIG. 1c.

FIG. 2—Signals of the magnetic angular component of the electromagnetic field $dB_\varphi/dt$ FIG. a, $dB_z/dt$ FIG. b when exciting a medium with a circular electric dipole, calculated for model of the polymetallic deposit.

Figure 3:
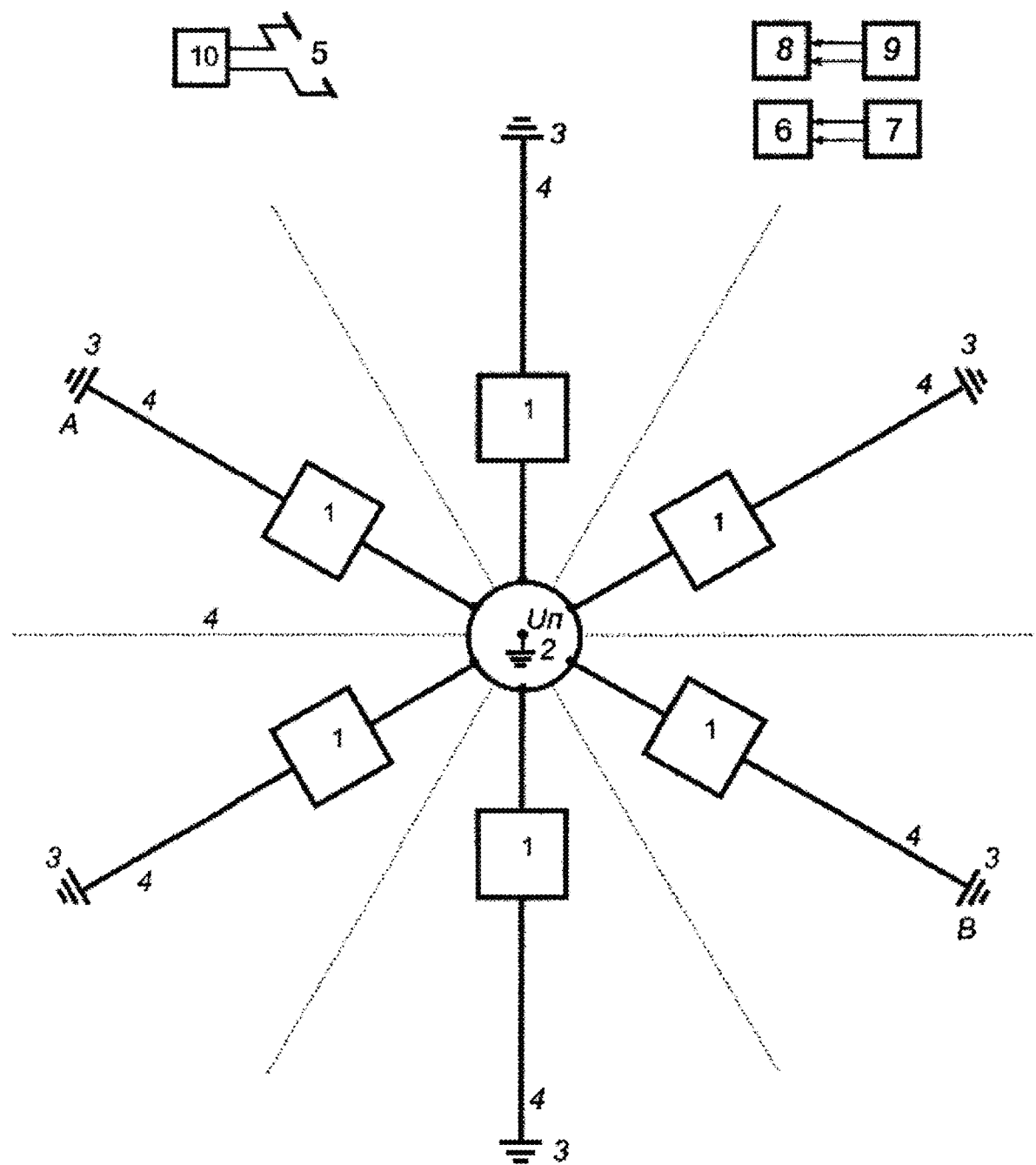

FIG. 3—Scheme of excitation and measurement of an electromagnetic field when the electromagnetic field is excited in a medium by a circular electric dipole.

Figure 4:
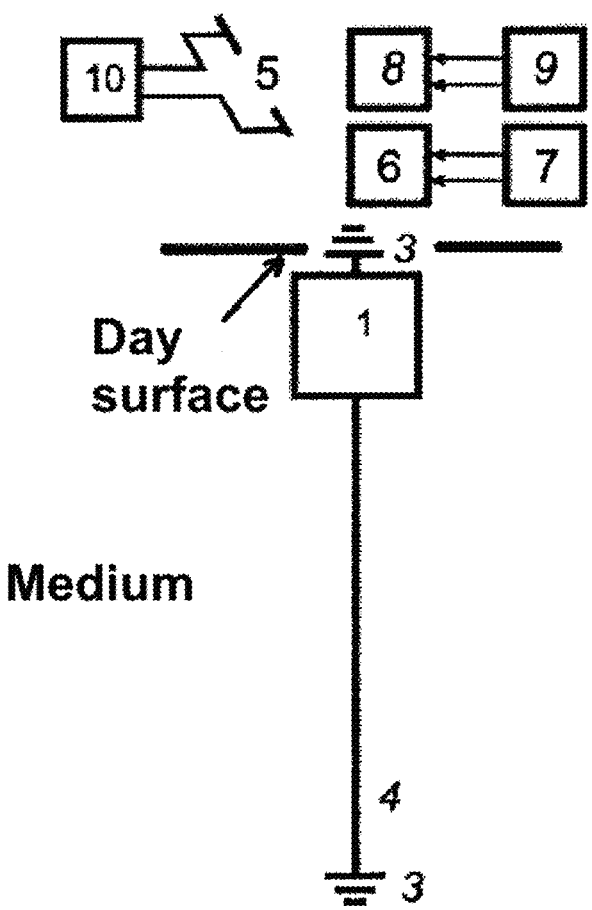

FIG. 4—Scheme of excitation and measurement of an electromagnetic field when the electromagnetic field is excited in a medium by a vertical electric line.

Figure 5:
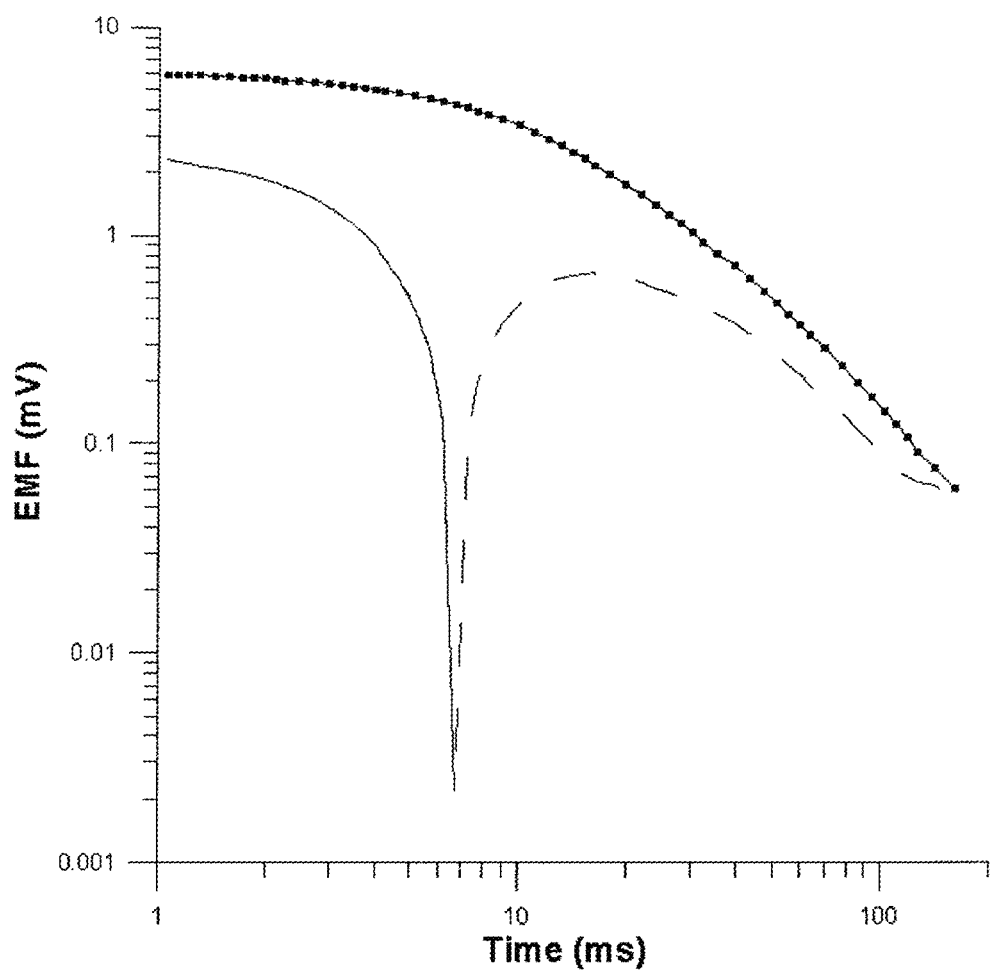

FIG. 5—Changes in the character of the signal of the measured electric radial component $E_r$ at one of the polymetallic deposits. Before crossing the border (upper curve). After crossing the border (bottom curve), negative values are shown by hatching.

Figure 6:
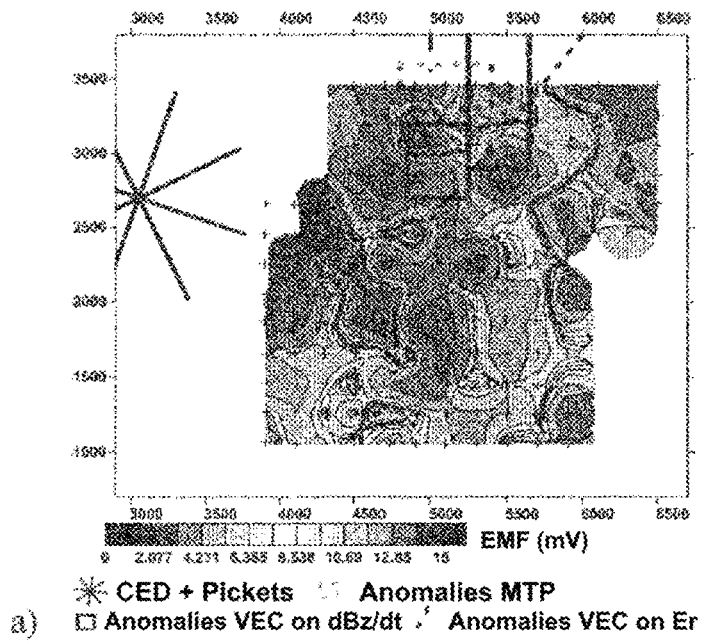
Figure 6:
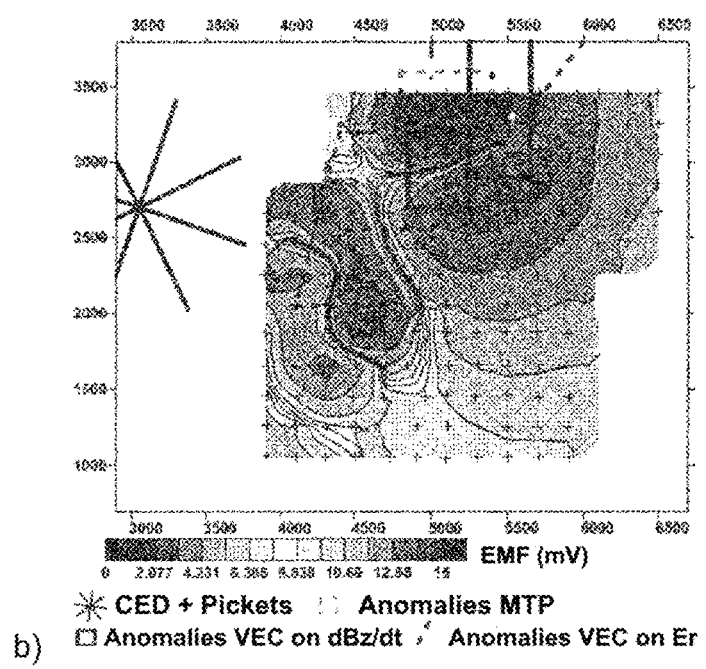

FIG. 6a—Areal (normalized) distributions of VECS signals at one of the polymetallic deposits. The component $dB_z/dt$ of the time is 0.78 ms. FIG. 6b—Areal (normalized) distributions of VECS signals calculated for model of anomalies, Component $dB_z/dt$ of the time is 0.75 ms.

DETAIL DESCRIPTION OF THE INVENTION

The work is divided into 3 stages: preparation of the source (sources), measurements of the magnetic and electric fields, processing (interpretation) of the measurement results.

The first stage is the preparation of the sources. One of two methods is used to excite TM-polarized field in the medium:

1) A circular electric dipole is installed on the day surface (FIG. 3). Based on the area under investigation, the depth of bodies, the noise level, grounding contact parameters, the size and number of radial segments 4 of the circular electric dipole and the amplitude of the current pulses of generators 1 are determined. The dimensions of the source and the current strength only influences the distance at which the useful signal exceeds the noise level. The circular electric dipole is placed on the ground according to FIG. 3. In this case, a current electrode 2 is grounded in the centre of the circle formed by uniformly grounded current electrodes 3. The current electrodes 3, the number of which must be at least 6, are connected to the first ends of the radial segments 4 of the supply lines, which are located along the radii of the circle through the same angle. A current generator 1 is included in each radial segment 4. The second ends of the radial segments 4 are connected to each other and connected to one of the poles of the power supply U. The other pole of the power supply U is connected to the current electrode 2. FIG. 3 shows 6 radial segments 4 with a solid line, which is the minimum required number of lines. The number of lines can be increased based on the need to carry out certain works. FIG. 3 shows 6 radial segments 4 with a dashed line, i.e. if we organize 6 additional radial segments 4, then there will be 12 rays in the circular electric dipole.

2) On the day surface or at some depth, the first grounding contact of a vertical line 3 is installed, and the second grounding 3 of the vertical line is installed strictly vertically under the overlying grounding (FIG. 4). The second grounding is installed either in a water reservoir or in a well, strictly vertically under the first grounding. The dimensions of the vertical line are determined based on the specific geophysical problem to be solved, the area under investigation, the sounding depth, as well as the depth of the water reservoir or well. The size and strength of the current in the source only influences the distance at which the useful signal exceeds the noise level. A current generator 1 is included in the vertical line 4. One end of the vertical line 4 is connected to one of the poles of the power supply U. The other pole of the power supply U is connected to the current electrode 3.

The second stage is signal measuring. In one of the two above-mentioned sources of the electromagnetic field, an electric current is passed. The current in the source must change, when the current in the source changes, transient processes begin in the medium, and at this time, changes in the magnetic field and changes in the electric field are measured on the day surface. The signals of the dependence of the magnetic and electric fields on time provide information about the electrodynamic parameters of the medium. Current pulses in the sources listed above are excited with a variable shape, i.e. rectangular, triangular, sinusoidal, etc.

After the change in the current in the generating set is started, measuring of the components of the electromagnetic field begins. The magnetic and electric components are measured. Measurements are performed on an arbitrary grid around the sources when using the circular electric dipole or vertical electric line as sources. Signal at each point is measured at all times at which the signal exceeds the noise level. Observation sites are determined based on the geophysical problem to be solved, the availability of observation points, the noise level, and the distance from the field source. When the counter electric line is used as a source, measurements are taken on the same straight line where the counter electric line is located.

Observation sites are determined based on the geophysical problem to be solved, the availability of observation points, the noise level, and the distance from the field source. The distance between the observation points influences the accuracy of determining the boundaries of the feature and is a compromise between the desire to determine the boundaries of the feature as accurately as possible and economic feasibility.

The magnetic components are measured using the meter 8 connected to the sensor 9 or using the meter 6 connected to the magnetometer 7. The electric components are measured using the meter 10 connected to the measuring line 5 (FIG. 3, 4).

The third stage is processing (interpretation) of the measurement results, restoration of electrodynamic parameters of the medium. First, the observed magnetic signal is mapped from the measurement results. Maps of the magnetic components are built at all times at which high quality measurements have been performed. When constructing maps, the distance between the observation point and the centre of the source is taken into account. To take into account the remoteness of the observation points, the signals are multiplied by the ratio of the distance between the observation point and the centre of the source to the radius of the source. Alternatively, the degree of this ratio is used, for example, the square of the ratio (formula 1).

The following normalization is used to visualize areal maps of the VECS magnetic components:

$$\varepsilon_i^{norm} = \varepsilon_i \cdot \left(\frac{r}{d}\right)^n, \qquad \text{formula 1}$$

wherein $\varepsilon_i$ is EMF value measured at the picket i, r is the distance between the CED centre and the measurement point, d is the diameter of the CED, n is a normalizing power that changes over time (usually from 1 to 3), but is constant for the entire area at a given time.

At the second stage of interpretation, initial approximations are set to search for three-dimensional bodies from the measurement data. Depending on which magnetic components were measured, the boundaries of the body are set based on the measurement data. For example, in the presence of measurements of the magnetic component $dB_z/dt$, the centre of the feature is set so that the line of changing the polarity of the measured signal of the magnetic component $dB_z/dt$ crosses it. For example, in the presence of measurements of the magnetic component $dB_\varphi/dt$, the edge of the feature that is near to the source of the electromagnetic field is set so that the feature is located under the maximum signals of the magnetic component $dB_\varphi/dt$.

At the third stage, the shape and electrodynamic parameters of the three-dimensional body are restored from the measured magnetic components of the electromagnetic field. The so-called inverse problem is solved, the purpose of which is to determine the three-dimensional model of the target body. For each three-dimensional model, the signals of the magnetic and electric components are calculated using algorithms taking into account a number of electrodynamic parameters, i.e. vertical conductivity, horizontal conductivity, body polarizability, as well as the parameters of conductivity and polarizability of the medium. By successive approximations in automatic or manual mode, the shape and electrodynamic parameters of the body model are changed so that the signal when calculating the electromagnetic field corresponds more and more to the observed signal, i.e. the differences between the observed signal and the signal calculated for the model decrease. The residual formula is used to formalize the difference between field and model signals. The residual is used to calculate the discrepancy in the signals, improving the correspondence between the fitted feature and the real body. The smaller the residual value, the better the parameters of the fitted feature correspond to the real body. One of the possible formulas for finding the residual is given in formula 2.

$$\sum_i \sum_j \sum_l \text{Abs}\left((\varepsilon_{ijl}^{culc} - \varepsilon_{ijl}^{field})/\varepsilon_{ijl}^{field}\right), \qquad \text{formula 2}$$

where i is the corresponding component of the magnetic field, j is the picket at which the measurements are performed, l is the time at which the measurements are performed, $e^{culc}$ ijl is the value of the calculated component of the magnetic field for the i-th component, the j-th picket, and the l-th time value, $\varphi^{field}$ ijl is the value of the measured component of the magnetic field for the i-th component, the j-th picket, and the l-th time value.

When detecting three-dimensional bodies, in addition to the magnetic components of the electromagnetic field, electric components are measured. These measurements provide additional data for detecting three-dimensional bodies. Electric signals measured in practice are not yet described by existing theories. It has been shown experimentally that in many deposits of polymetallic ores, as well as in kimberlite and tuff pipes, the character of the signal changes drastically upon crossing the boundary of the body that is near to the source of the electromagnetic field. FIG. 5 shows an example of a change in the character of the signal of the measured electric component $E_r$ at one of the polymetallic deposits. FIG. 5 shows that before crossing the border (upper curve), the signal gradually falls off. After crossing the border (lower curve), the signal drops sharply and goes through 0 (negative values are shown by hatching). Thus, measuring the electric components in many sites is used to identify the boundary of the body that is near to the source of the electromagnetic field.

Example of the Implementation of the Claimed Method

The aim of the investigation was to detect deposits of polymetallic ores at depths from 300 to 1000 meters.

These works were carried out on a site with an area of slightly more than 5 km$^2$, the measurement grid is close to a square grid of 200*200 m. The investigation was carried out by two techniques:

1) By the transient electromagnetics method, i.e. TEM. TEM is a classical, widespread technique that uses only TE-polarized field. In this work, a square loop with a side of 200 m was used as a source, and the current strength in the loop was 10 A. A coaxial installation was used; the receiver was a sensor with an effective area of 10,000 m$^2$. The magnetic component of the electromagnetic field $\partial B_z/\partial t$ was measured at the centre of the source.

2) VECS. The source of the field was a circular electric dipole with a radius of 750 m, the total current in the source was 80 A. Periodic rectangular current pulses were passed through the source. The following electromagnetic field components were measured: $dB_z/dt$, $\partial B_\varphi/\partial t$, $E_r$. The components of the electromagnetic field $dB_z/dt$, $\partial B_\varphi/\partial t$ were measured by sensors with an effective area of 30,000 m$^2$. The $E_r$ component was measured with a receiving line 50 m long, a preamplifier with a factor of 10, and the measurement accuracy was 10 µV.

Let us consider the $\partial B_z/\partial t$ component measurement results. The working range of times at which information about the anomaly was manifested was determined by us to be from 0.5 ms to 1.5 ms.

FIG. 6a shows the results of field measurements at a time of 0.78 ms. The figure also shows the contours of the anomaly based on the TEM results as a gray hatched contour, anomalies based on the $dB_z/dt$ results of the VECS as a black solid contour, and anomalies based on the polarization according to the $E_r$ component as a dashed black contour. FIG. 66 shows the results of calculations for the "Severnaya" anomaly model at a time of 0.75 ms. The figure also shows the contours of the anomaly based on the TEM results as a gray hatched contour, anomalies based on the $dB_z/dt$ results of the VECS as a black solid contour, and anomalies based on the polarization according to the $E_r$ component as a dashed black contour. It should be noted that the centres of the anomalies in the plan are determined with good accuracy.

If we assume that the contour according to the VECS results is closer to the contour of the real anomaly, then it is possible to understand why the anomaly according to the TEM is displaced relative to the anomaly according to the VECS. A loop of 200 m is quite large when studying anomalies with a characteristic width of 400 m. The greatest change in conductivity at depths greater than 100 m will be at points that are near to both branches of the anomaly, southern and northern, and not above the branches of the anomaly themselves. The polarization anomaly also correlates much better with the VECS contour. Based on these considerations, we believe that the anomaly manifested itself both in the TEM and in the signal of the $E_r$ component of the VECS, and in the $dB_z/dt$ signal of the VECS, but it is the anomaly according to the $dB_z/dt$ results of the VECS that is closest to the real contour.

We claim:

1. A method of prospecting for three-dimensional bodies by geoelectric techniques, comprising:
    generating an alternating transverse magnetic (TM) polarized electromagnetic field,
    measuring an electromagnetic transient response signal of the medium under investigation and interpreting the measurements,
    wherein the magnetic and electric components of the electromagnetic field are measured and interpreted according to signals received using a three-dimensional model, for which purpose the centre of three-dimensional heterogeneity above which a change in the polarity of the signal takes place is determined on the basis of the measured values of the vertical component of the magnetic field, and the boundary of multiple deposits of target bodies that is near to the source is determined according to a signal of the horizontal angular magnetic component which changes polarity as it approaches the boundaries of a feature, the signals of the horizontal angular magnetic component of the electromagnetic field having the highest value above the feature, between the near-source boundary and the centre of the source,
    wherein the boundary of the deposits of the target bodies that is near to the source of the alternating transverse magnetic (TM) polarized electromagnetic field is additionally determined according to an electric component of the electromagnetic field, the character of the signal of which changes drastically upon crossing the boundary of the feature, and
    wherein the alternating transverse magnetic (TM) polarized electromagnetic field is generated using a vertical line.

2. The method of prospecting for three-dimensional bodies by geoelectric techniques according to claim 1, wherein the alternating transverse magnetic (TM) polarized electromagnetic field is generated using a circular electric dipole (CED).

* * * * *